United States Patent
Grunewald

(10) Patent No.: US 9,161,676 B2
(45) Date of Patent: Oct. 20, 2015

(54) AUTOMATIC DISHWASHER

(71) Applicant: Eichenauer Heizelemente GmbH & Co. KG, Kandel (DE)

(72) Inventor: Jerome Grunewald, Silz (DE)

(73) Assignee: Eichenauer Heizelemente GmbH & Co. KG, Kandel (DE)

( * ) Notice: Subject to any disclaimer, the term of this patent is extended or adjusted under 35 U.S.C. 154(b) by 59 days.

(21) Appl. No.: 13/933,324

(22) Filed: Jul. 2, 2013

(65) Prior Publication Data

US 2014/0007767 A1 Jan. 9, 2014

(30) Foreign Application Priority Data

Jul. 6, 2012 (DE) .......................... 10 2012 013 322

(51) Int. Cl.
*A47L 15/48* (2006.01)
*A47L 15/42* (2006.01)

(52) U.S. Cl.
CPC ........... *A47L 15/481* (2013.01); *A47L 15/4291* (2013.01); *Y02B 40/44* (2013.01)

(58) Field of Classification Search
CPC ... A47L 15/4291; A47L 15/481; Y02B 40/44
See application file for complete search history.

(56) References Cited

U.S. PATENT DOCUMENTS

2011/0114134 A1 5/2011 Jerg et al.

FOREIGN PATENT DOCUMENTS

| DE | 10353774 | 2/2005 |
|----|----------|--------|
| DE | 102008054834 | 7/2010 |
| EP | 2301409 | 3/2011 |
| WO | 2005053504 | 6/2005 |
| WO | 2010012709 | 2/2010 |
| WO | 2010052116 | 5/2010 |
| WO | 2011091940 | 8/2011 |

OTHER PUBLICATIONS

Translation of EP2301409 A1; Maier et al. Dec. 11, 2010.*

* cited by examiner

*Primary Examiner* — Christopher P Jones
(74) *Attorney, Agent, or Firm* — Volpe and Koenig, P.C.

(57) ABSTRACT

An automatic dish washer with a washing chamber (1) and a device for conveying humid air out of the washing chamber to a drying device (2) is provided. The drying device (2) includes at least one sorption unit (3). According to the invention the drying device (2) includes at least one heat exchanger (11). The heat exchanger (11) serves to transfer heat from the sorption unit (3) to washing water and/or fresh water.

17 Claims, 6 Drawing Sheets

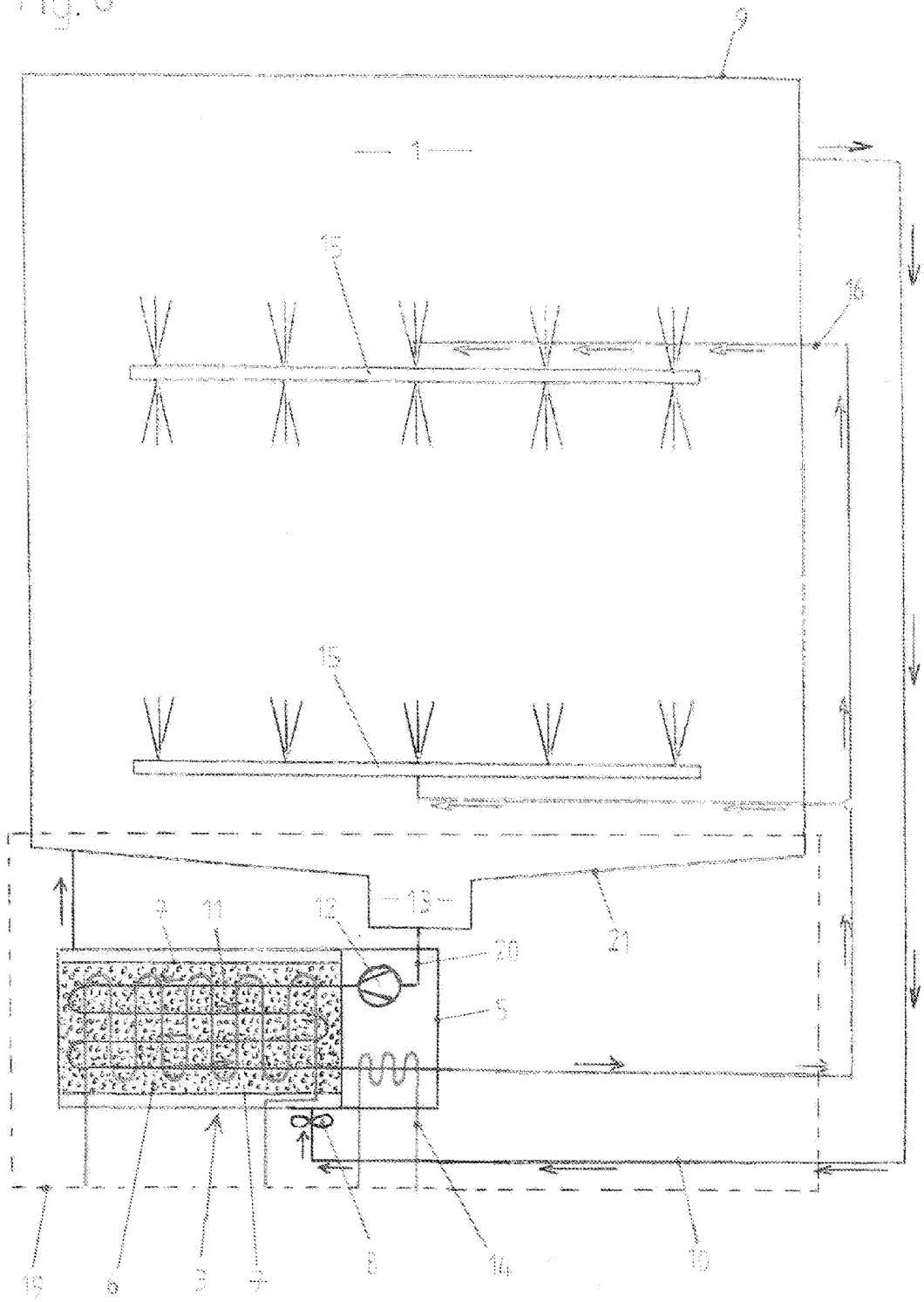

AUTOMATIC DISHWASHER

INCORPORATION BY REFERENCE

The following documents are incorporated herein by reference as if fully set forth: German Patent Application No. DE 10 2012 013 322.7, filed Jul. 6, 2012.

BACKGROUND

The invention relates to an automatic dish washer with a washing chamber and a device for conveying humid air out of the washing chamber to a drying device, with the drying device comprising at least one sorption unit.

WO 2010/012709 A1 and WO 2010/052116 A1 describe automatic dish washers with a sorption drying system. Here, humid air is guided out of the washing chamber through a drying device in order to dry the dishes. For this purpose, the washing chamber is connected via at least one passage to a drying device, in order to generate an air exchange.

DE 103 53 774 A1 describes an automatic dish washer comprising a sorption column. The sorption column is used to dry the dishes. The thermal energy used for desorption is used to heat the rinsing liquid located in the washing chamber and the dishes.

Furthermore, household machines are known from DE 10 2008 054 834 A1, which operate according to the principle of a heat pump. The household machines comprise a closed system, sealed gastight from the exterior, with a cold side and a warm side.

The drying device comprises a sorption unit, which shows a material which can be reversibly dehydrated, with preferably a zeolithic material being used. After the rinsing process, during the program step "drying", the zeolithic material accepts water vapors from the humid air of the washing chamber, which flow through the sorption unit.

After the adsorption of the water vapor during this program step the zeolithic material heats up. After the sorption unit, now the dry and warm air is returned into the washing chamber. By the use of the drying device it now shows a lower humidity, can once more be charged with water vapor maximally up to saturation, and is then again guided over the drying device. By the use of such drying devices the drying period of the dishes is considerably shortened.

The zeolithic material used in the sorption unit must be regenerated after the drying step. This regeneration is also called desorption. Here, the zeolithic material is strongly heated so that the water vapor bonded to the surface is desorbed. This regeneration process occurs only shortly before the next hot washing process because the zeolithic material otherwise would accept water vapor from the environmental air and thus showed a lower adsorption capacity.

The desorbed hot water vapor is guided into the washing chamber and here condenses at the surface of the dishes and the walls of the washing chamber. Energy is saved by utilizing this condensation heat. The energy expense for heating the washing water is therefore reduced.

Automatic washing machines with a sorption drying system are some of the most energy efficient in the world. Due to their high energy efficiency such automatic dish washers are awarded very good energy consumption ratings, which are a very important argument for many consumers when rendering a purchase decision.

During the regeneration phase here not only water vapor is desorbed but additionally the zeolithic material itself is heated. After the regeneration phase the sorption material cools only slowly by releasing heat to the environment.

SUMMARY

The object of the invention is to provide an automatic dish washer exhibiting a further increase in energy efficiency in reference to machines of prior art with sorption drying systems and having a cooling period of the sorption material which is accelerated. The drying device shall again be ready for use as quickly as possible. Here, the drying device has a maximally possible adsorption capacity for moisture from the washing chamber, so that the respective washing program is shortened. Additionally, the automatic dish washer is characterized in a simple and cost-effective production process. Furthermore, the integration of the system according to the invention shall occur with the lowest possible expense.

This objective is attained according to the invention in that the drying device comprises at least one heat exchanger for transferring heat from the sorption unit to washing water and/or fresh water.

According to the invention a heat exchanger is used, which after the regeneration cools the zeolithic material and simultaneously heats washing water. This way the heat stored in the sorption material is not lost to the environment but is used to heat the washing water. The heat exchanger ensures that the sorption material cools faster and thus the drying device is once more ready for use at an earlier point of time.

A device transports moist air from the washing chamber to the drying device. The dried air is delivered back into the washing chamber. The device may, for example, may be implemented as a fan, a blower or ventilator. Also a plurality of conveyors can be used. For example the device may be arranged in a region where the humid air is transported from the washing chamber to the drying device. Alternatively or additionally the device may also be arranged in a region where the dry air flows from the drying device to the washing chamber. The device may be embodied as an independent construction module. It can be connected to tubes. The device can also be integrated in a tube or the washing chamber. In a particularly advantageous variant of the invention, the device is integrated into the drying unit. This forms a compact unit.

According to the invention the drying device, in addition to the sorption unit, comprises a heat exchanger. In principle, it would also be possible to arrange the heat exchanger next to the sorption unit. However, it has proven particularly advantageous to arrange the heat exchanger at least partially inside the sorption unit. Preferably the heat exchanger is arranged entirely inside the sorption unit.

By integrating the heat exchanger in the zeolithic bed, the effectiveness of the heat exchange from the zeolithic material to the washing water is considerably improved. Here, it has proven beneficial if an exchange area as large as possible is given between the zeolith and the heat exchanger. Additionally it is advantageous when the heat exchanger is made from a material with optimal heat conducting features.

The heat exchanger may be embodied as a pipe coil, which extends inside the sorption unit. Due to the fact that the zeolithic material is a relatively poor heat conductor it is beneficial for a large contact area being created between the heat exchanger and the sorption material so that a good heat transfer is ensured.

Washing water flows through the heat exchanger. The washing water and the sorption material are spatially separated from each other. An indirect heat exchange occurs. Heat exchangers of this type are also called recuperators.

When a pipe coil is used as the heat exchanger the pipe walls separate the washing water inside from the sorption material surrounding the pipe. Preferably the wall thickness is as thin as possible in order to improve the heat exchange.

It has proven particularly beneficial for the automatic dish washer to comprise a connector of the heat exchanger to the washing chamber through which the circulating washing water flows. This connector may represent a pipe. Preferably the connector is connected at the trap of the automatic dish washer. The circulating washing water is conveyed from there via a pump through the heat exchanger. The circulating washing water heats while simultaneously the sorption material cools.

After flowing through the heat exchanger another connector leads back into the washing chamber. Preferably this also represents a pipe, which for example supplies the washing jets with water.

Alternatively or in addition to the circulating washing water fresh washing water can also be supplied to the heat exchanger. In this variant the automatic dish washer comprises a connector of the heat exchanger with the fresh water connector. The fresh washing water flows through the heat exchanger and is subsequently guided into the washing chamber. Advantageously here fewer corrosion problems arise, thus the heat exchanger can also be embodied in a less corrosion resistant material, for example aluminum.

In order for the zeolith to cool as fast as possible and to use the heat stored therein, the fresh washing water is guided through the heat exchanger and then into the washing chamber.

The use of cold fresh washing water contributes to an increase of the adsorption capacity of the sorption unit, because the sorption material is cooled to a larger extent. The colder the sorption material the greater its sorption capacity.

By the use according to the invention of the heat exchanger in the drying device thus on the one hand energy to heat the washing water is saved and on the other hand the adsorption capacity of the sorption unit is improved. This leads to a considerable increase in energy efficiency and thus to a better rating of the automatic dish washers.

In one variant of the invention first the circulating washing water is guided through the heat exchanger. If the sorption unit then shall be further cooled subsequently fresh washing water having a lower temperature in reference to the circulating washing water can be guided through the heat exchanger.

In a particularly advantageous embodiment of the invention the temperature sensors monitor the temperature of the washing water and/or the temperature of the sorption material and adjust via a control device the optimal ratio of fresh washing water and circulating washing water. The control device may represent for example a control programmable from memory or a regulator.

The sorption material must be heated for regeneration. In one variant of the invention for this purpose hot air flows through the sorption unit. Here, a heating element is arranged upstream in reference to the air intake into the sorption unit, which heats the air.

In another variant of the invention the heating element is arranged in the sorption unit and directly heats the sorption material. Preferably here an open wire heating element is used. The water vapor desorbs and is preferably guided off by an air flow and conveyed thereby into the washing chamber.

Here, any mandatory circulation by a fan can also be waived.

In a particularly preferred embodiment the heating element and the heat exchanger are directly connected in a heat-conducting fashion. Here, they are for example connected along their longitudinal sides. Advantageously this way the heat stored in the heating element itself can be used for heating the washing water because the heating element itself shows a heat capacity and still shows a high temperature after the desorption process.

The automatic dish washer comprises at least one washing water heater which additionally or as an alternative to the heat exchanger heats the washing water. This heating element is preferably arranged downstream in reference to the heat exchanger, seen in the direction of flow of the washing water. If the heat transferred from the sorption material to the washing water is insufficient additional energy is supplied via the downstream arranged washing water heater in order to reach the desired temperature. The washing water heater comprises at least one electric heating element.

It has proven particularly advantageous for the automatic dish washer to comprise an assembly including the drying device. Preferably the assembly comprises a casing and forms a compact part, which is installed in its entirety during the assembly of the automatic dish washer. Here, the casing includes the required water guiding and/or electric connections.

Here, it has proven beneficial for the assembly to be insulated towards the exterior. The insulation may be arranged either inside the casing or outside around the casing.

A container or a housing, for example made from plastic, may be used as the casing. In principle, the insulation may also be formed by the casing itself, with here for example a thermally insulating plastic being used as the material.

In one variant of the invention this downstream arranged heating element for heating the washing water is arranged in the drying device. In this variant the drying device forms an assembly which in addition to the sorption unit and the heat exchanger additionally comprises the heating element for heating the washing water. Preferably a thermally insulating layer is located between the sorption unit and the additional heating element.

Here, additionally or alternatively the pump to convey the circulating washing water and/or fresh washing water may also be arranged in the drying device. This results in a compact assembly, which combines all components required for drying and/or heating the washing water.

Additionally a fan can be integrated in this assembly to convey the humid air out of the washing chamber so that the drying device, in addition to the sorption unit and the heat exchanger, also includes this device.

The washing chamber is formed by a washing container. The washing container is preferably embodied cube-shaped and comprises, in addition to its four lateral walls, also a lid and a bottom.

In a particularly beneficial embodiment of the invention at least a part of the bottom of the washing chamber is integrated in the drying device. For example, this part of the bottom of the washing chamber can simultaneously form the lid of the drying device. In this variant of the invention the drying device embodied as a compact assembly is mounted from the bottom and forms this way at least a portion of the bottom and/or the trap of the washing chamber.

Different washing programs can be selected in order to operate the automatic dish washer. Each washing program comprises a plurality of program steps, which are processed successively. For example, such a program may include the program steps pre-rinsing, cleaning, interim rinsing, clear rinsing, and drying.

In particular in the program step "cleaning" a heating of the washing liquid occurs. The method for heating the washing water comprises a first phase, in which the desorption is performed. The sorption material is either heated directly via a heating element or indirectly via hot air. The removed water vapor is guided into the washing chamber and condenses here. Preferably it mixes with the liquid already present in the washing chamber, with a heating of the combined quantity of liquids occurs in the washing chamber. In order to ensure a better mixing it has proven beneficial when during this process the washing water is circulated with a pump.

According to the invention after the desorption heating of the washing water occurs via the heat exchangers. The washing water heats while simultaneously the sorption material cools. This way, the heat stored in the sorption material is not lost to the environment but serves for heating the washing water.

Due to the fact that the washing liquid at this point of time has already been subjected to a temperature increase subsequently a certain quantity of fresh washing water can be guided through the heat exchanger in order to further cool the sorption material.

If the additional heat supplied via the heat exchanger is insufficient a washing water heater is activated in a separate third phase and/or simultaneously to the first and/or simultaneously to the second phase.

The washing water heater may be integrated in the pump. Alternatively, in addition to the pump a separate tank-less water heater or a water boiler may be provided. In addition to this circulating pump the automatic dish washer also comprises a lye pump for clearing the washing chamber. The lye pump is connected to the pump trap and is connected via a drainage pipe to the sewer system. Preferably only a single pump is provided, though.

BRIEF DESCRIPTION OF THE DRAWINGS

Additional features and advantages of the invention are discernible from the description of exemplary embodiments based on drawings and from the drawings themselves.

Here, shown are.

DETAILED DESCRIPTION OF THE PREFERRED EMBODIMENT

Figure 1:
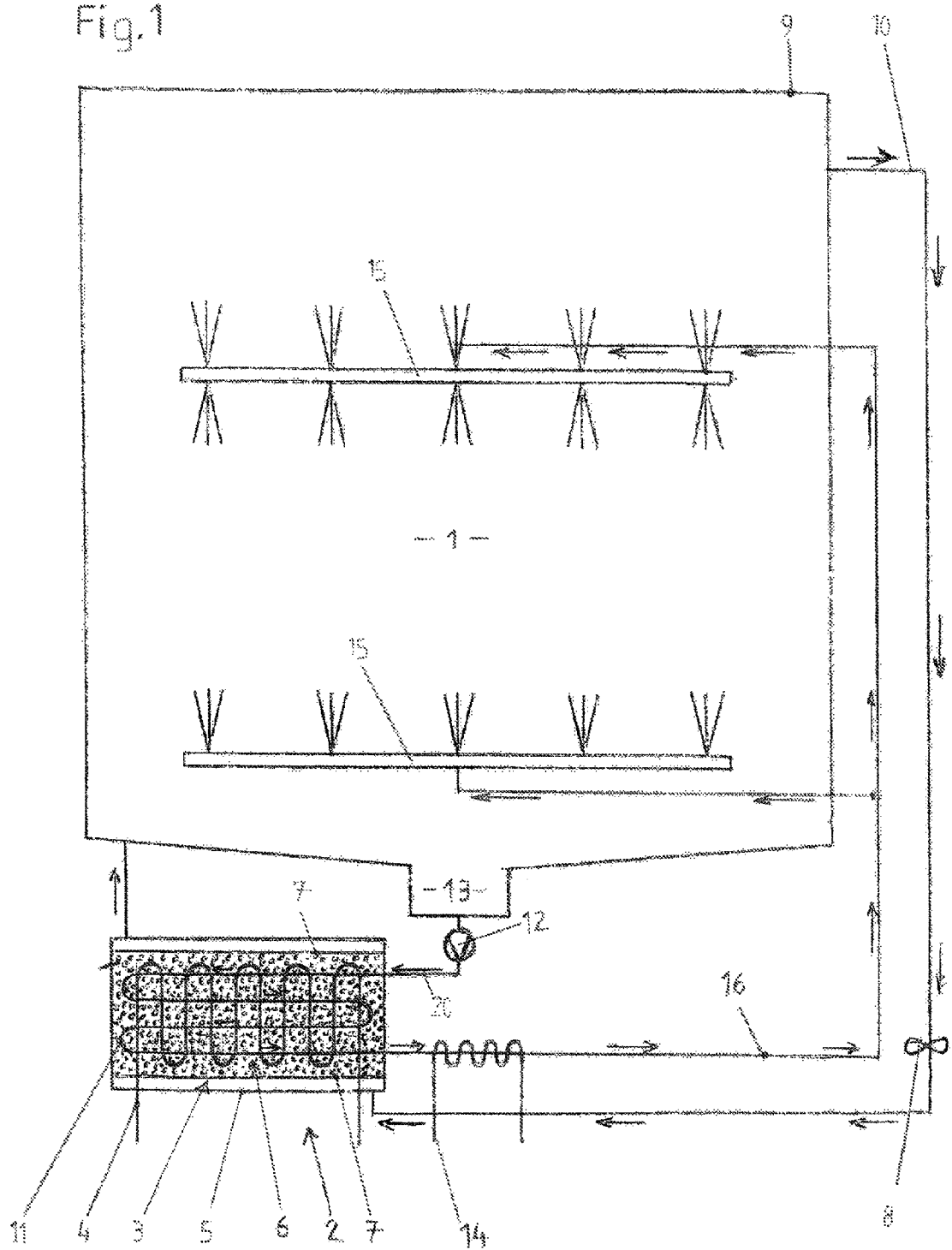
FIG. 1 an automatic dish washer with a heating element integrated in the sorption material, FIG. 2 an automatic dish washer with a switching device for the washing water, FIG. 3 an automatic dish washer with an assembly comprising the drying device and the washing water heater, FIG. 4 an automatic dish washer with an assembly comprising the drying device, the washing water heater, and the fan, FIG. 5 an automatic dish washer with an assembly comprising the drying device, the washing water heater, the fan, and the pump, and FIG. 6 an automatic dish washer with an assembly comprising the drying device, the washing water heater, the fan, the pump, and the bottom of the washing chamber.

FIG. 1 shows an automatic dish washer with a washing chamber 1 and a drying device 2. The drying device 2 represents a sorption drying system. The drying device 2 comprises a sorption unit 3 and a heating element 4 for desorption.

The sorption unit 3 comprises the sorption material 6 and sieve bottoms 7, with the sorption material being arranged therebetween.

In the exemplary embodiment a zeolith is used as the sorption material 6. The sorption material 6 may be present in various fashions. For example, it may be present as a continuous solid body or as a loose bulk material. In the exemplary embodiment a zeolithic bulk material is used. The material bulk comprises a loose granulate, preferably in the form of small pellets.

Here, it has proven beneficial for this material to be arranged on a sieve bottom 7. The sieve bottom 7 may for example be embodied as a web, wire mesh, or perforated sheet metal.

The sorption material 6 is limited by at least one sieve bottom 7, so that the sorption material 6 is prevented from falling out and simultaneously air can flow through the bulk of the sorption material 6.

Humid air from the washing chamber 1 is conveyed via a device 8, which may for example be embodied as a fan, a blower, or a ventilator.

The device 8 can be arranged in a region where the humid air is transported from the washing chamber 1 to the drying device 2 as shown in FIG. 1. Alternatively or additionally the device 8 may also be arranged in a region where the dry air flows from the drying device 8 to the washing chamber 1. The device 8 may be embodied as an independent construction module. It can be connected to tubes. The device 8 can also be integrated in a tube or the washing chamber 1.

The washing chamber 1 is formed by a washing container 9, which comprises an outlet to be connected to an air duct 10. In the variant shown in FIG. 1 the device 8 is arranged in the air duct 10. The device 8 conveys humid air from the washing chamber 1 to the drying device 2. The humid air is absorbed at the sorption material 6 of the sorption unit 3. Here, the sorption material 6 heats up. The dried warm air flows through an inlet back into the washing chamber 1.

After the program step "drying" the sorption material 6 must be regenerated. For this purpose the sorption material 6 is strongly heated via the heating element 4, with the temperatures here ranging from 230 to 250° C.

In a particularly advantageous variant of the invention a temperature sensor (not shown) is arranged in the sorption unit 3, which detects the temperature of the sorption material 6.

The expressed water vapor is guided into the washing chamber 1 and condenses here.

After the desorption phase the sorption material 6 is still very hot. According to the invention the drying device 2 comprises a heat exchanger 11, which transfers the heat from the sorption material 6 to the washing water.

In the variant shown in FIG. 1 the heat exchanger 11 represents a pipe coil, which is wound in several loops. FIG. 1 shows as an example three loops of the heat exchanger 11. The pipes of the pipe coil, arranged parallel in reference to each other, extend in the example shown in FIG. 1 in a horizontal direction and parallel in reference to each other. Preferably the pipe coil may additionally show ribs in order to improve the heat transfer.

All figures show a particularly beneficial variant of the invention, in which the heat exchanger 11 is arranged in the sorption unit 3. Here, the heat exchanger 11 is surrounded by the sorption material 6. Accordingly a particularly good heat transfer is ensured.

Washing water is conveyed via a pump 12 through the heat exchanger 11. The washing water is obtained from the trap 13. The pump 12 conveys the liquid collected in the trap 13 through the heat exchanger 11. The liquid heats up in the heat exchanger 11, by heat being transferred from the sorption material 6 of the washing water. This way, the sorption material 6 cools. After passing the heat exchanger 11, the washing water is additionally heated by a washing water heater 14. The washing water heater 14 can be an electric heating element. In the exemplary embodiment the washing water heater 14 is embodied as a separate tank-less water heater. Subsequently the heated washing water is returned into the washing chamber 1. Here the washing water is fed to spray arms 15. The spray arms 15 comprise jets by which the washing water is distributed in the washing chamber 1.

The heat exchanger 11 is connected via a pipe 16 to the washing chamber 1, via which the washing water is fed to the spray arms 15.

Figure 2:
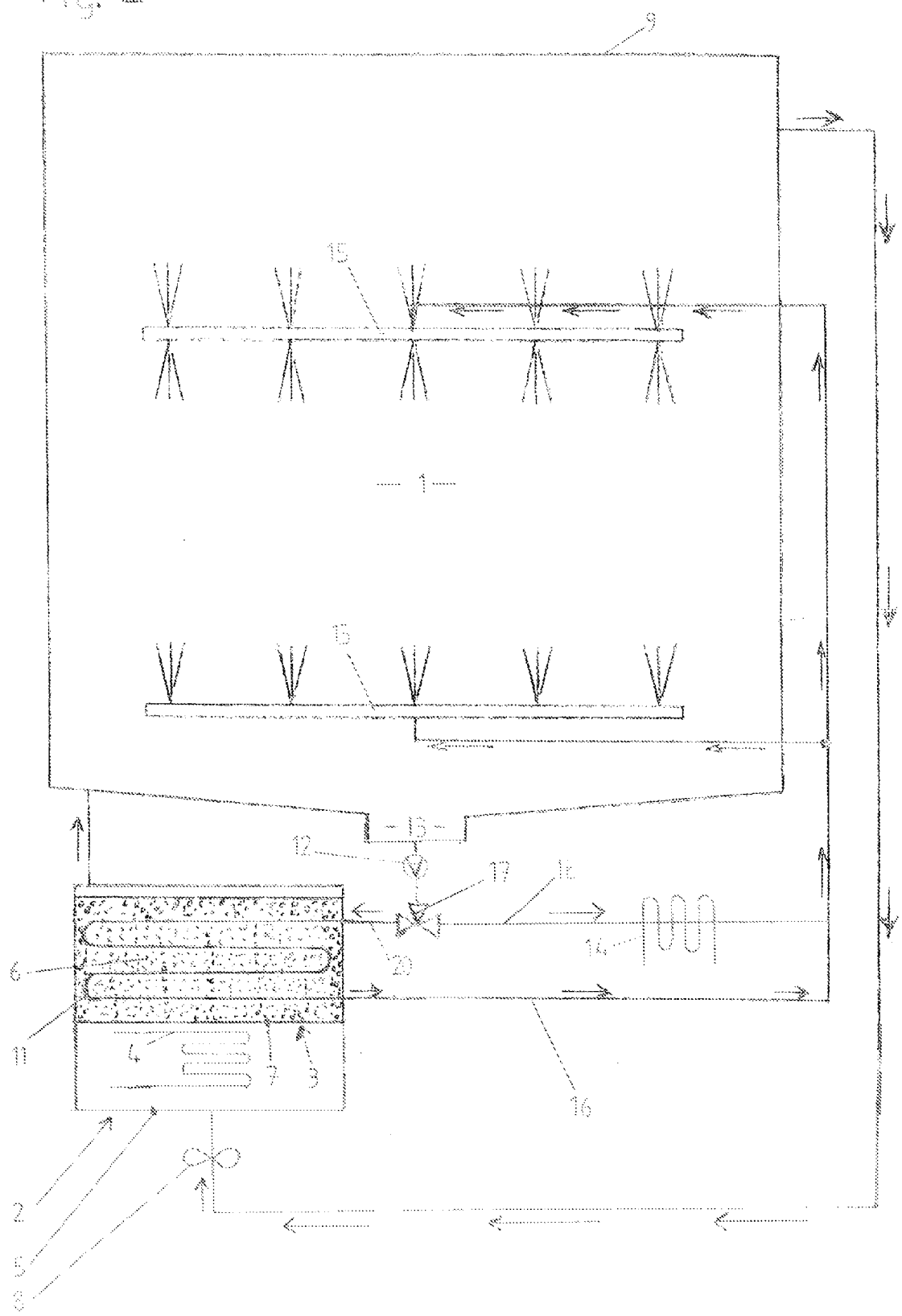

FIG. 2 shows an alternative embodiment of the invention. In this variant the drying device 2 comprises a sorption unit 3, in which a heat exchanger 11 is arranged, as well as a heating element 4 for desorption. The drying device 2 is surrounded by a container 5. In the variant shown in FIG. 2 the heating element 4 in the container 5 is arranged upstream in reference to the sorption unit 3, seen in the direction of flow. This represents an electric heating element 4. An airflow is generated via the device 8. The air flow is heated in the drying device 2 by the heating element 4, before it flows through the sorption unit 3. This way an air heater is provided. The hot air can evenly flow through the sorption material 6. This way, so-called "hot spots" are prevented, i.e. local overheated sections in the sorption material 6.

Water is desorbed during the regeneration of the sorption material 6 and evaporates as vapor. The water vapor is conveyed with the air flow, which flows through the sorption unit 3, back into the washing chamber 1, where it condenses and releases its heat.

In the variant shown in FIG. 2 the automatic dish washer comprises a switching device 17. The switching device 17 represents a multi-path fitting. After the water has been removed from the sorption material 6 during the desorption process the heating element 4 is switched off. The heat still stored in the sorption material 6 is used according to the invention via the heat exchanger 11, which is arranged in the sorption unit 3. Here, the switching device 17 generates a connection via the connector 20 between the washing chamber 1 and the heat exchanger 11. The pump 12 removes washing water from the trap 13 of the washing chamber 1 and guides it through the heat exchanger 11. The washing water heats the in the heat exchanger 11, with simultaneously the sorption material 6 cooling, here. After passing the heat exchanger 11, the washing water flows through the pipe 16 back into the washing chamber 1, where it is distributed by the spray arms 15. A temperature sensor is arranged in the sorption unit 3 (not shown in FIG. 2) which forwards the measurements to the control device, which is not shown in the figures, either.

After the sorption material 6 has cooled to a certain temperature the control device switches the switching device 17 such that no washing water flows through the heat exchanger 11 any longer, but through the electric washing water heater 14. This way, the washing water is further heated until it has reached the required temperature for the program step "cleaning". In this variant of the invention the automatic dish washer therefore comprises a bypass 18, through which the washing water can flow, if necessary, without it being necessary to guide it through the heat exchanger 11.

The method for operating an automatic dish washer according to the variant shown in FIG. 2 comprises the following steps:

First phase of heating the washing water:
the desorption heating element 4 is switched on,
the conveyer device 8 for humid air is switched on,
(a conveyer device 17 guides washing water via the bypass 18; optional),
(the pump 12 is switched on; optional), the washing water heater 14 is switched off,
the desorbed water vapor is guided into the washing chamber 1 (and here mixes with the circulated washing water; optional)

Second phase of heating the washing water:
a switching device 17 guides the washing water through the heat exchanger 11,
the washing water heats in the heat exchanger 11 and cools the sorption material 6,
after passing through the heat exchanger 11 the washing water is guided via a connector 16 into the washing chamber 1.

Third phase of heating the washing water:
the switching device 17 guides the washing water via the bypass 18,
the washing water heater 14 is switched on,
the heating of the washing water via washing water heater 14,
the washing water is brought to the temperature required for the program step "cleaning".

Figure 3:
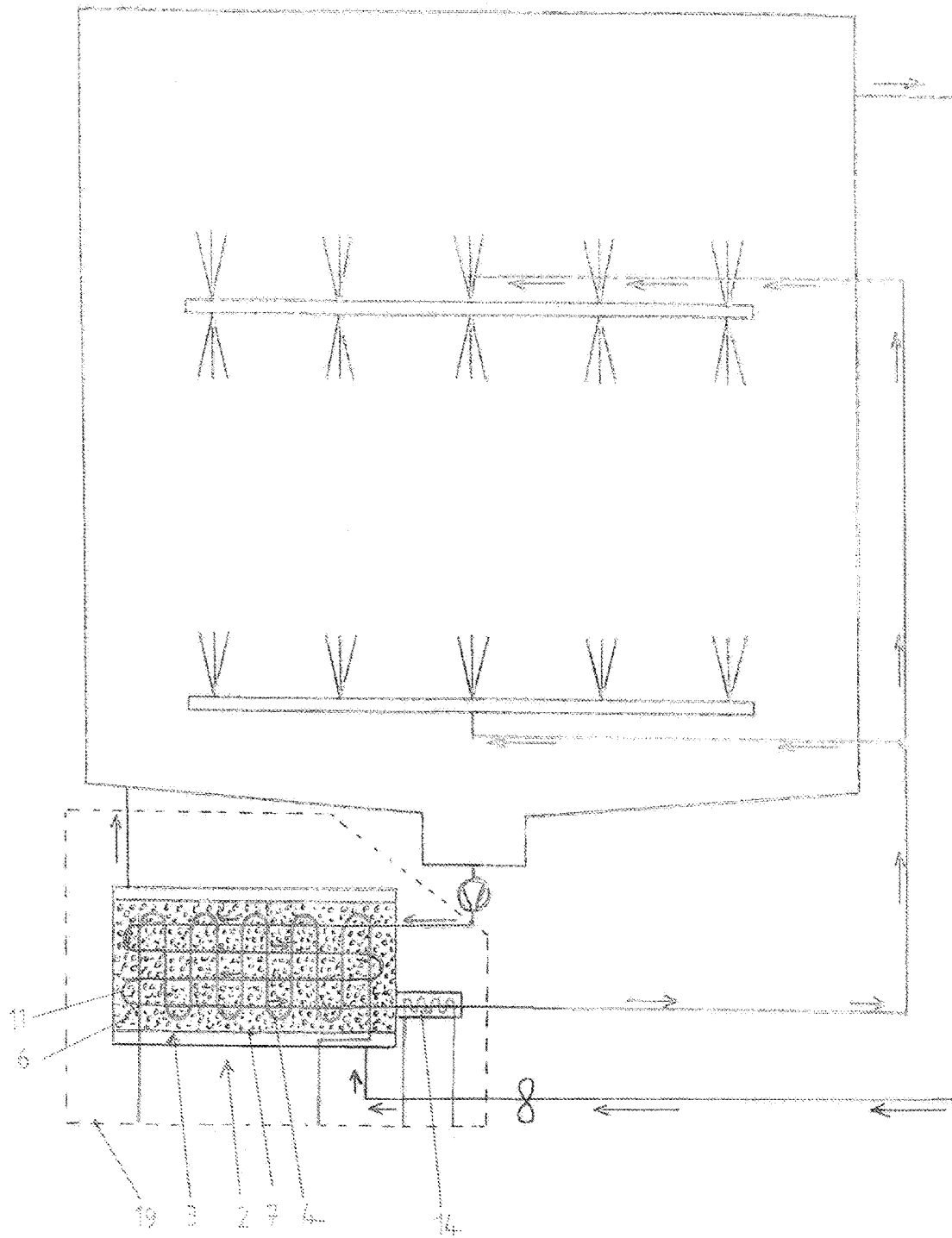

FIG. 3 shows a variant in which the automatic dish washer comprises an assembly 19, which is shown in dot-dash lines. The assembly 19 represents a compact assembly, which is arranged in the exemplary embodiment underneath the washing chamber 1 of the automatic dish washer. In the variant shown in FIG. 3 the assembly 19 comprises the drying device 2 and the washing water heater 14. The drying device 2 in turn comprises the sorption unit 3, in which the heat exchanger 11 and the heating element 4 are arranged. The sorption unit 3 in turn comprises the sorption material 6 and can be arranged as bulk material between two sieve bottoms 7. The compact assembly 19 shows the advantage that not all components must be mounted individually in the automatic dish washer but rather they are integrated in the automatic dish washer as the entire compact assembly 19 during the production.

Figure 4:
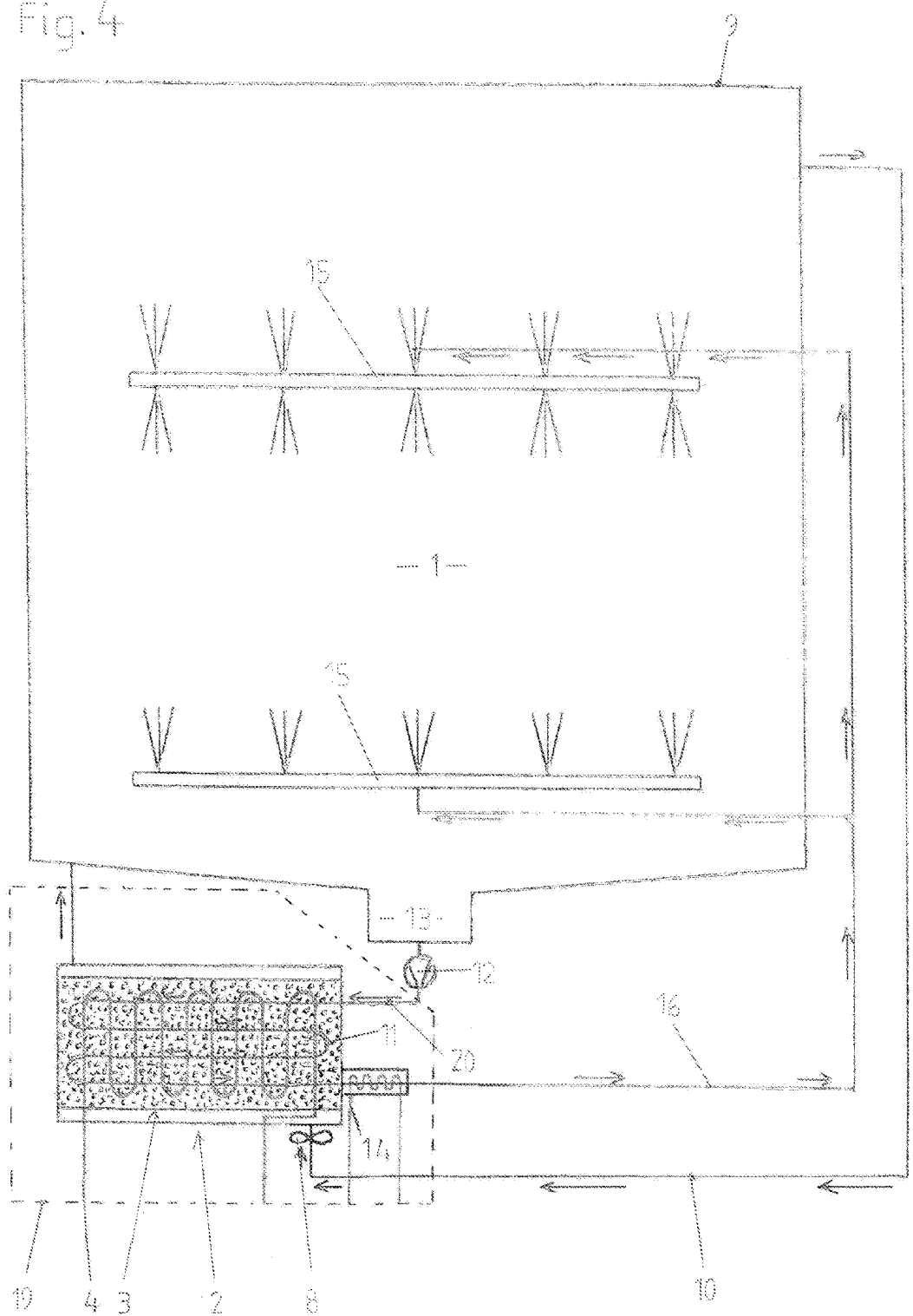
Figure 5:
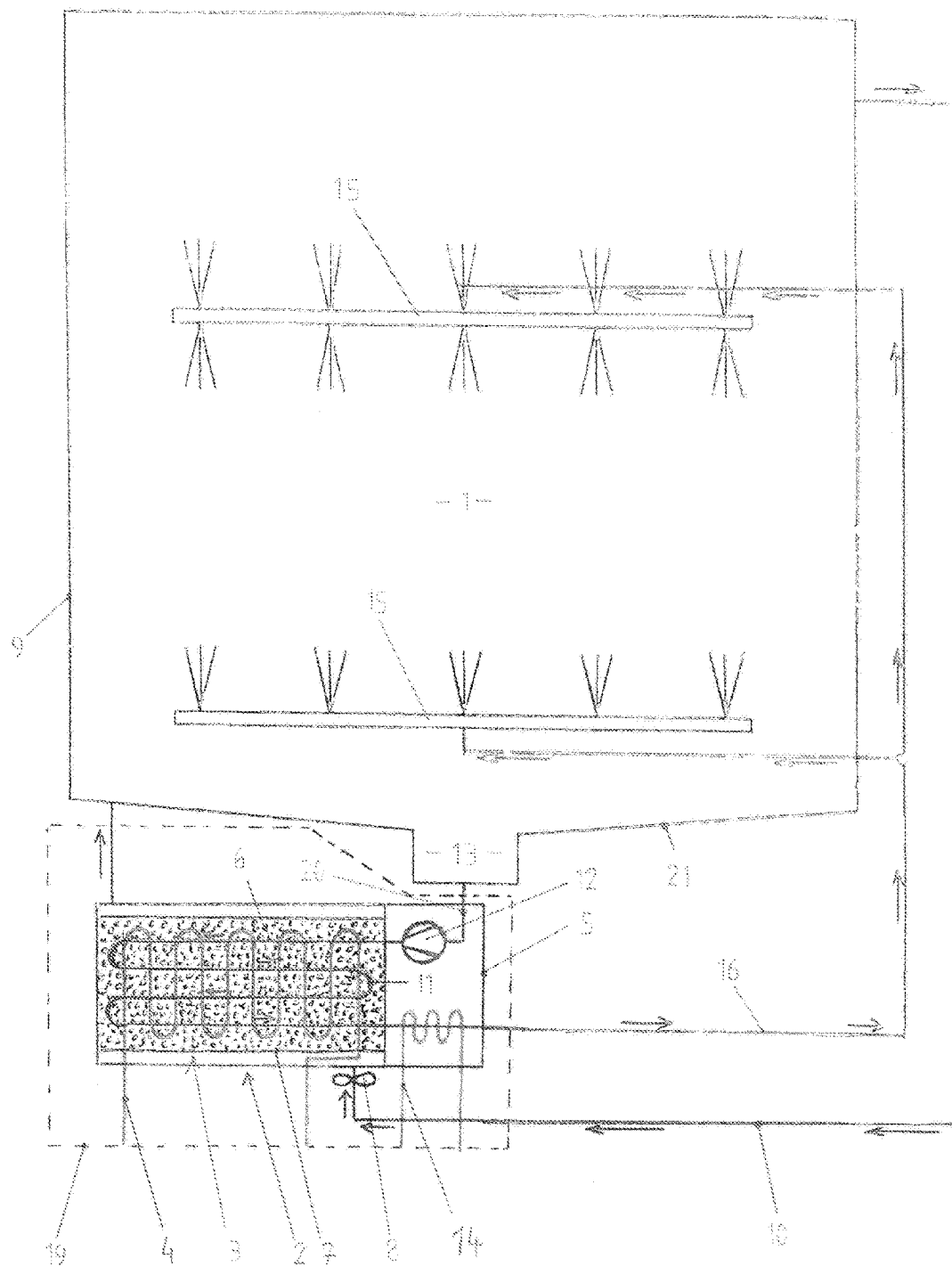

FIG. 4 shows a variant in which the assembly 19 additionally comprises the device 8. FIG. 5 shows a variant in which the assembly 19 additionally comprises a pump.

In the variant shown in FIG. 6 the assembly 19, in addition to the variant previously shown, comprises the bottom 20 of the washing chamber 9. As an alternative thereto, in a variant not shown as a figure, only the trap 13 may be a component of the assembly 19.

The invention claimed is:

1. An automatic dish washer comprising a washing chamber (1) and a device (8) to convey humid air from the washing chamber (1) to a drying device (2), the drying device (2) comprises at least one sorption unit (3) and at least one heat exchanger (11) to transfer heat from the sorption unit (3) to at least one of washing water or fresh water, and the heat exchanger (11) is arranged at least partially within the sorption unit (3), wherein a pipe of the heat exchanger (11) that carries at least one of the washing water or the fresh water is arranged at least partially in the sorption unit (3).

2. An automatic dish washer according to claim 1, further comprising a connector (20) between the washing chamber (1) and the heat exchanger (11) for the circulating washing water flowing through the heat exchanger (11).

3. An automatic dish washer according to claim 1, further comprising a connector between a water inlet and the heat exchanger (11) for fresh washing water to flow through the heat exchanger (11).

4. An automatic dish washer according to claim 1, further comprising at least one heating element (4) arranged in the sorption material (6) for desorption.

5. An automatic dish washer according to claim 4, wherein the heating element (4) is embodied as an open wire heating element.

6. An automatic dish washer according to claim 4, wherein the heating element (4) and the heat exchanger (11) are directly connected to each other in a heat-conducting fashion.

7. An automatic dish washer according to claim 1, further comprising an assembly (19) which includes the drying device (2).

8. An automatic dish washer according to claim 7, wherein the assembly (19) includes insulation on an outside.

9. An automatic dish washer according to claim 7, wherein the assembly (19) comprises a washing water heater (14).

10. An automatic dish washer according to claim 7, wherein the assembly (19) comprises a fan (8) to convey an airflow through the sorption unit (3).

11. An automatic dish washer according to claim 7, wherein the assembly (19) comprises a pump (12) to convey washing water.

12. An automatic dish washer according to claim 7, wherein the assembly (19) comprises a trap (13) of the automatic dish washer.

13. An automatic dish washer according to claim 7, wherein the assembly (19) comprises at least a part of a bottom (21) of the washing chamber (9) of the automatic dish washer.

14. A method for drying humid air from a washing chamber (1) of an automatic dish washer, comprising:
   conveying humid air from the washing chamber (1) over a sorption unit (3),
   adsorption of humidity from the air in the sorption unit (3),
   conveying dry air back into the washing chamber (1),
   heating the sorption unit (3) for desorption of water out of the sorption material (6) and condensation of desorbed water vapor in the washing chamber (1),
   at least one of washing water or fresh water flowing through a heat exchanger (11) to transfer heat from the heated sorption material (6) to the washing water, with the heat exchanger (11) being arranged at least partially in the sorption unit (3), and a pipe of the heat exchanger (11) that carries at least one of the washing water or the fresh water also being arranged at least partially in the sorption unit (3).

15. A method according to claim 14, wherein the washing water is guided over a washing water heater (14).

16. An automatic dish washer according to claim 1, wherein the heat exchanger (11) is integrated in a zeolithic bed of the sorption unit.

17. An automatic dish washer according to claim 1, wherein the pipe is arranged as a pipe coil that extends inside the at least one sorption unit.

* * * * *